May 31, 1927. Re. 16,643

M. H. LUCE

LOCKING DEVICE FOR TRUNKS

Original Filed Jan. 17, 1923 2 Sheets-Sheet 1

Inventor,
Milton H. Luce
By Ira Milton Jones
Attorney

May 31, 1927. Re. 16,643

M. H. LUCE

LOCKING DEVICE FOR TRUNKS

Original Filed Jan. 17, 1923 2 Sheets-Sheet 2

Inventor

Milton H. Luce

By Ira Milton Jones

Attorney

Reissued May 31, 1927. Re. 16,643

UNITED STATES PATENT OFFICE.

MILTON H. LUCE, OF KANSAS CITY, MISSOURI, ASSIGNOR TO WHEARY TRUNK COMPANY, OF RACINE, WISCONSIN.

LOCKING DEVICE FOR TRUNKS.

Original No. 1,578,537, dated March 30, 1926, Serial No. 613,136, filed January 17, 1923. Application for reissue filed January 5, 1927. Serial No. 159,247.

My invention relates to improvements in locking devices for trunks, and is particularly applicable to wardrobe trunks of the general type disclosed in Letters Patent of the United States to George H. Wheary, No. 1,134,175, dated April 6, 1915, although it is also applicable to ordinary trunks, such for example, as those disclosed in Letters Patent of the United States to said George H. Wheary, No. 1,158,412, dated October 26, 1915, and to numerous other trunks in common use.

The primary object of this invention is to provide improved means whereby the motion of a movable member associated with a key operated lock may be transmitted to one or more distant locking members to automatically operate the latter, whereby the closing and locking together of the parts of a trunk at one point, will without any attention on the part of the user result in a doweling, binding and locking together of trunk parts at one or more other points.

Further objects of this invention are to provide means whereby motion transmitting mechanism located within one section of a trunk may be utilized to operate locking devices located wholly or partially exterior to the trunk walls;—to provide means whereby auxiliary locking devices, dependent for locking operations upon a movable member associated with a manually operable lock, may be automatically retracted when such movable member is unlocked or retracted;—to provide means whereby the auxiliary locking devices will effectively draw the associated sections of the trunk into binding relation with each other;—to provide auxiliary locking devices which may be protected by suitable housings located in part upon the interior face and in part upon the exterior face of the associated wall of a trunk section which the housing also reenforces;—to provide means whereby an auxiliary locking device, when released, will initially open or separate the parts controlled thereby; and in general to provide auxiliary locking devices of the above described type which will not only be efficient and durable under conditions of severe use, but which will also be capable of use without reducing the capacity of the trunk, injuring its contents or in any manner interfering with the use of the trunk for any ordinary purpose or the proper packing or unpacking thereof.

As applied to wardrobe trunks, it is an object of my invention to provide means whereby all movable parts of the auxiliary locking mechanism may be mounted upon or in the wardrobe section of the trunk, leaving the interior of the body section wholly free and unobstructed for the reception of packed fabrics or the operation of drawers or other receptacles within which clothing is to be packed. It is well known that the ordinary wardrobe trunk has a body section which is usually subdivided by shelves, drawers or partitions into compartments within which clothing may be packed or within some of which articles may be placed which would be injured by compression or packing. One other section, commonly termed the wardrobe section, is utilized to receive articles of wearing apparel which may be suspended from hangers mounted upon suitable supports at one end of the trunk or section. It is desirable that the body section be wholly unobstructed by any movable or motion transmitting parts or mechanisms for locking the trunk sections together, inasmuch as such parts either occupy space exterior to the drawers or other compartments and thereby reduce the capacity of the trunk body or allow the articles packed in the trunk body to contact with and be injured by such movable parts. This invention, therefore, contemplates a location of the movable connections for the auxiliary locking devices in the wardrobe section where suspended clothing will bear only lightly against the locking devices even if the latter are exposed.

In the drawings:—

Like parts are identified by the same reference characters throughout the several views.

Figure 1:
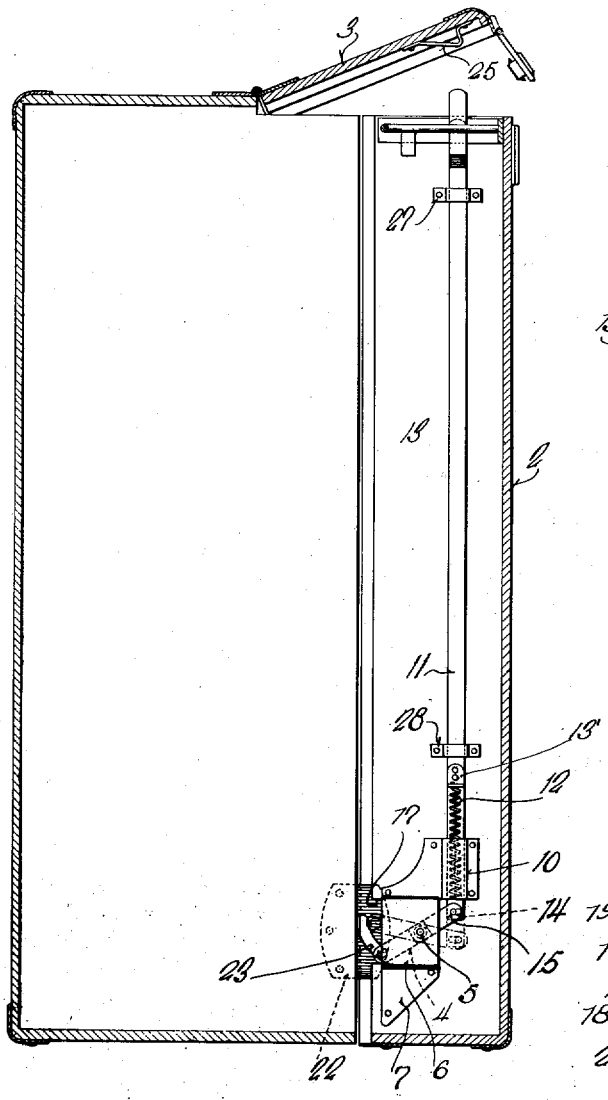
Figure 1 is a vertical sectional view of a wardrobe trunk equipped with my improved locking mechanism, the section being drawn to a plane transverse to that which includes the meeting edges of the body and wardrobe sections.
Figure 2:
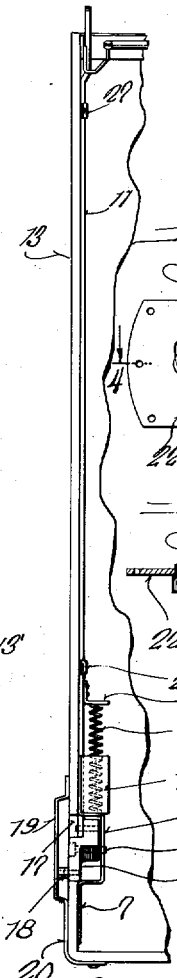
Figure 2 is a view of a fragment of the wardrobe section showing my improved locking mechanism applied to one side wall thereof.
Figure 3:
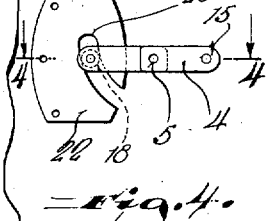
Figure 3 is a detail view of the locking lever and associated catch plate.
Figure 4:
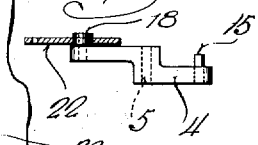
Figure 4 is a top view of the locking lever showing the catch in section on line 4—4 of Figure 3.

Figure 1 shows a wardrobe trunk having a body section 1, a wardrobe section 2, and a lid or cover section 3, all organized and arranged substantially as disclosed in said former patent to George H. Wheary, No. 1,134,175. But in place of the locking mechanism disclosed in said patent for holding the lower portions of the wardrobe section and body section together, I employ a locking lever 4 which is fulcrumed at 5 within a housing 6. The housing 6 is provided with end flanges 7 and 8 which are secured to the inner face of the side wall 13 of the wardrobe section and the flange 8 has a semi-cylindrical offset portion 10 which forms a guideway for the vertically disposed operating bar 11 and a partial enclosure for a coiled, compression spring 12, the lower end of which is anchored to the bottom of the guideway 10 and the upper end of which is seated against a bracket 13 carried by the bar 11.

The lower end of the bar 11 is provided with a slot 14 in which a pin 15 carried by the power end of the lever 4 is loosely engaged. The other end of the lever is offset and positioned within a notch 17 formed in the supporting side wall 13 of the wardrobe section 2 and this offset portion of the lever is provided at its free end with a projecting stud 18, preferably exterior to said section wall, but protected by a housing plate or member 19 which may constitute an extension of the reenforcing corner piece 20.

A housing 19 also forms a doweling pocket to receive a doweling catch plate 22 carried by the opposing wall of the body section 1. This doweling catch plate is provided with a curved slot 23 adapted to receive the stud 18 carried by the lever 4 when said lever is swung to locking position. The outer margin of the slot 23 is so formed that the stud 18 may move with a wedging action thereon when the lever is swung to locking position, thereby drawing the opposing side walls of the wardrobe section and body section into binding pressure contact. The inner wall of the slot 23 is also formed to receive the pressure of the stud 18 while the lever is being swung from locking to unlocking position, whereby said opposing walls may be initially separated during this movement of the locking lever.

The spring 12 tends to hold the bar 11 in a raised position with the inner end of the lever 4 correspondingly raised and the outer or locking end, with the locking stud 18, depressed to releasing position, i. e., to a position with the stud 18 withdrawn from the doweling catch plate 22. The lever 4 is swung to locking position by applying downward pressure to the bar 11 and this downward pressure may be applied by the lid or cover section 3, preferably through a bracket 25 secured to the inner face of said section in a position to bear upon the upper end of the bar 11 and push said bar downwardly when the lid or cover section 3 is swung to closed position. Said lid or cover section may be locked in closed position as disclosed in said former Patent No. 1,134,175, but as no specific locking mechanism is essential it is not deemed necessary to illustrate or describe it. It is obvious that as long as the lid or cover section is closed the bar 11 will be held in its depressed position. And the arrangement is such that when the bar 11 is thus depressed the locking lever 4 will occupy a position substantially as indicated by dotted lines in Figure 1 with the locking stud 18 near the upper end of the slot 23 in the catch plate 22, in which position the edges of the wardrobe section of the trunk will be in binding pressure engagement with the meeting edges or margins of the body section.

Guide clips 27 and 28 are preferably applied to the side wall 13 of the wardrobe section to hold the rod 11 in operating position.

Figure 5:
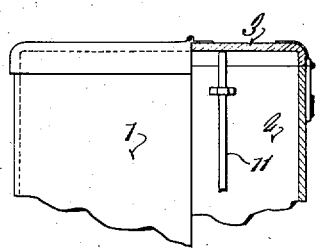
Figure 5 is a fragmentary view of the upper end of a wardrobe trunk, partly in elevation and partly in section, showing a slight modification.

In Figure 5 the parts illustrated are identical with those illustrated in Figure 1, except that the locking bar 11 is made a little longer and the lid section 3 is not provided with the bracket 25. The top of the lid section 3, therefore, bears directly upon the operating piece or bar 11.

Figure 6:
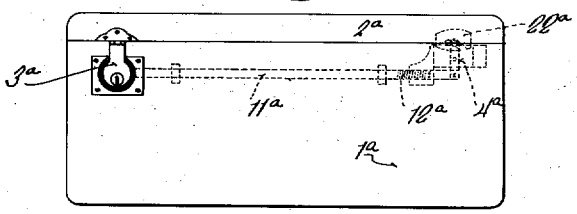
Figure 6 is an elevation of an ordinary trunk illustrating my invention as applied thereto.
Figure 8:
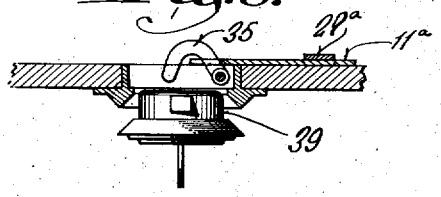
Figure 8 is a detail view of the manually controlled portion of the lock operating means employed in the structure disclosed in Figure 6, the fragment of the side wall of the body portion of the trunk being shown in horizontal section.

In Figure 6 a trunk is illustrated with a body section $1^a$ and a cover section $2^a$ which may be taken as representative of any ordinary trunk in common use. The cover section is locked to the body section by an ordinary key operated lock having a hasp $3^a$ which corresponds functionally with the lid 3 shown in Figure 1 so far as the invention herein disclosed is concerned. The hasp $3^a$ constitutes a swinging member, the motion of which is utilized to actuate the operating piece of bar $11^a$ through means similar to that disclosed in said former patent to Wheary No. 1,290,445, i. e., through the curved lever arm 35 disclosed in Figure 8 of the drawings of this application. The hasp is provided with an ordinary locking barrel 39 which, when the hasp is in locking position, bears upon the free end of lever 35 and pushes the lever inwardly. Near its fulcrum the lever bears upon the end of the locking bar $11^a$ and pushes the same in opposition to the retracting spring $12^a$, thereby swinging the locking lever $4^a$ into locking relation to the doweling catch $22^a$.

In the structure disclosed in Figure 6 the locking lever $4^a$ directly co-operates with the key operated lock to hold the respective ends of the lid section $2^a$ in contact with the opposing margins of the body section. One key is, therefore, utilized to lock the lid section to the body section at two widely separated points.

Figure 7:
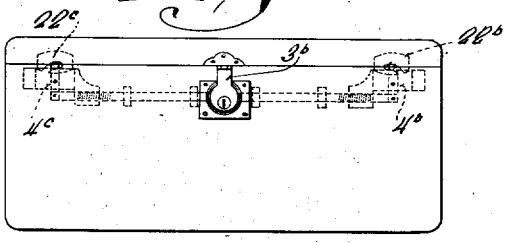
Figure 7 is a similar view showing a slight modification of the structure disclosed in Figure 6.
Figure 9:
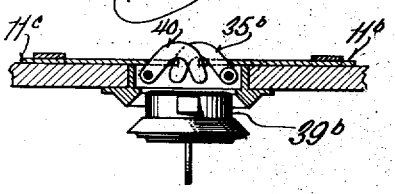
Figure 9 is a similar view of the corresponding mechanism employed in the structure disclosed in Figure 7.
Figure 10:
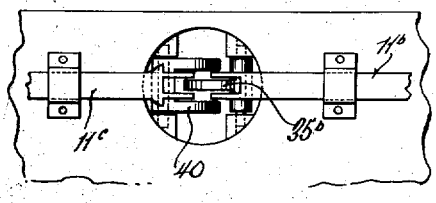
Figure 10 is a view of the same as seen from the inner side of the trunk wall.

If greater security in the fastening of the lid section is desired, the structure illustrated in Figures 7, 9 and 10 may be utilized. In these views a trunk is illustrated in which the hasp $3^b$ is centrally located and the locking barrel $39^b$ is utilized to actuate two oppositely disposed, curved levers $35^b$ and 40, respectively. The lever $35^b$ actuates an operating bar $11^b$ in exactly the same manner as above described with reference to Figure 6, whereby the locking lever $4^b$ near one end of the trunk is actuated to locking position.

The lever 40 similarly, but in the opposite direction transmits motion through a sliding bar $11^c$ to a locking lever $4^c$ located near the other end of the trunk disclosed in Figure 7. The lid of this trunk is, of course, provided with two doweling catches $22^b$ and $22^c$ which are, respectively, engaged by the locking levers $4^b$ and $4^c$.

From the foregoing description of the modified forms disclosed in Figures 5, 6 and 7, it will be obvious that my invention is not limited to the use of any particular manually operable swinging member for actuating an operating piece or bar, such as the bar 11, to transmit motion to the locking lever. Any member of the trunk, such as the cover 3, which requires to be manually operated or moved when closing the trunk may be utilized to apply the necessary power to the operating piece 11 and transmit motion to the point where a locking engagement is to be auomatically effected. However actuated to locking position, it is obvious that my improved locking mechanism is effective to accurately dowel the parts to be locked, draw them together with binding pressure and not only release them when the manually operable member is moved to releasing position, but automatically separate them initially to a sufficient extent to allow the user to grasp the separated margins and to open the body and wardrobe sections of the trunk without difficulty.

As applied to a wardrobe trunk, my invention has the further advantage above noted, viz, that all of the parts are located outside of the body section and all of the movable parts are located within or upon the wardrobe section. Also the locking mechanism per se is located at the lower end of the wardrobe section below the point reached by any but the longest garments to be suspended within said section, these locking parts furthermore being housed in such a manner as to prevent them from catching in the fabric of any clothing contained in said section. The doweling members and the locking stud 18 are located wholly outside of the section so that there is no danger of clothing being caught by the doweling catch 22 and forced into the housing 19 or entangled with the stud 18.

I claim:

1. Trunk locking mechanism comprising the combination with the meeting margins of two trunk sections, of a locking lever fulcrumed to the wall of one section, the adjacent margin of the section being recessed and said lever having an offset portion adapted for swinging movement in said recess, a locking device carried by the offset portion of the lever, and a co-operating catch carried by the registering wall member of the opposing trunk section.

2. Trunk locking mechanism comprising the combination with trunk sections having mating margins, of a fixed catch on the side wall of one section adapted to serve as a doweling member, a housing on the opposing side wall of the other section adapted to serve as a doweling socket, a locking lever within said last mentioned housing, fulcrumed thereto, and having an offset portion in said doweling socket adapted to engage the doweling catch to lock the latter in said socket.

3. Trunk locking mechanism comprising the combination with trunk sections having mating margins, of a fixed catch on the side wall of one section adapted to serve as a doweling member, a housing on the opposing side wall of the other section adapted to serve as a doweling socket, a locking lever within said last mentioned section, fulcrumed thereto and having an offset portion in said doweling socket adapted to engage the doweling catch to lock the latter in said socket, a distant manually operable member, and motion transmitting connections for utilizing its movement in one direction to actuate said lever to locking position.

4. Trunk locking mechanism comprising the combination with trunk sections having mating margins, of a fixed catch on the side wall of one section exterior to the inner surface of the wall, a lever fulcrumed to the opposing wall of the other section and having a projection adapted to engage said catch, an operating piece pivoted to the lever, a manually operable actuating member adapted to move the operating piece in one direction, and means for automatically moving the operating piece in the other direction when relieved of the pressure of the actuating member.

5. In a trunk locking mechanism, the combination with a trunk section wall provided with a recess, of a locking lever fulcrumed adjacent to said recess and having a working end portion offset into said recess and provided with a locking projection, a sliding bar mounted upon the inner face of said section and having slotted pivotal connection with one end of the lever, resilient means for normally holding the bar and lever in unlocking position, and manually operable means for actuating said bar to swing the lever into locking position.

6. In a trunk locking mechanism, the combination with a trunk section wall provided with a recess, of a locking lever fulcrumed adjacent to said recess and having a working end portion offset into said recess and provided with a locking projection, a sliding bar mounted upon the inner face of said section and having slotted pivotal connection with one end of the lever, resilient means for normally holding the bar and lever in unlocking position, manually operable means for actuating said bar to swing the lever into locking position, said manually operable means having a key-controlled lock adapted to hold the manually operable means and thereby the bar and lever in locking position.

7. Trunk locking mechanism comprising the combination with trunk sections having meeting margins, of a fixed catch on the side wall of one section providing a curved slot, a lever fulcrumed to the opposing wall of the other section and having a projection adapted to engage in said slot, motion transmitting connections for actuating said lever to locking position from a distant point, and a spring for retracting said lever when the actuating pressure is relieved, said slot having curved margins adapted to be engaged by the projection on the lever and so formed as to draw the sections together when the lever moves to locking position and to force them apart to some extent when the lever is moved to unlocking position.

8. In a trunk locking mechanism, the combination with a trunk section wall provided with a recess, of a doweling housing on one side of said recess, a lever housing on the other side of said recess, a lever fulcrumed within the lever housing and having a portion extending into the doweling housing, and another trunk section provided with a catch adapted to enter the doweling housing when the sections are closed together, said catch being adapted to be engaged by said lever.

9. In a trunk locking mechanism, the combination with a trunk section wall provided with a recess, of a doweling housing on one side of said recess, a lever housing on the other side of said recess, a lever fulcrumed within the lever housing and having a portion extending into the doweling housing, another trunk section provided with a catch adapted to enter the doweling housing when the sections are closed together, said catch being adapted to be engaged by said lever, together with a manually operable device for securing said sections together at a point distant from said lever, and means for automatically transmitting motion from the manually operable securing device to move said lever to locking position when the securing device is in securing position.

10. Trunk locking mechanism comprising the combination with a trunk having a body section, a wardrobe section, and a lid section adapted to close one end of the wardrobe section, of means exterior to the body section and wardrobe section for doweling and locking said sections together near their lower ends, and lock actuating means within the wardrobe section adapted to be actuated by the lid section into locking position, together with means for automatically releasing the wardrobe section from lock engagement with the body section when the lid section is raised.

11. Trunk locking mechanism comprising the combination with a trunk having a body section, a wardrobe section, and a lid section adapted to close one end of the wardrobe section, of a doweling catch projecting from the lower end of the body section, a locking lever fulcrumed at the lower end of the wardrobe section and adapted in one position to engage the doweling catch, means for transmitting motion from the lid section to said locking lever to move the same into such engagement, and means for automatically retracting the lever when the lid section is swung to open position.

12. The combination with a wardrobe trunk having a pair of hingedly connected sections, one section having an open top closed by a movable cover, of co-operating locking elements carried by the hinged sections and actuating means for the locking elements carried by one section and normally extending above the top thereof and in the path of the movable cover whereby movement of the cover to its closed position engages the actuating member to actuate the locking elements and lock the hinged sections closed.

13. In a wardrobe trunk having a pair of hingedly connected sections, a fixed top for one section and a movable lid for the other section which, when closed, secures the sections together adjacent their tops, a fixed locking element carried by one section, a movable locking element carried by the other section and engageable with the fixed element to lock the sections together adjacent their bottoms, an actuating member carried by said other section, and normally extending above the top thereof and in the path of the movable cover, and an operating connection between the movable locking element and the actuating member, said actuating member being actuated by the movable lid in closing to engage the movable locking element with the fixed locking element.

14. In a wardrobe trunk having a pair of sections hinged together, one section having an open top closed by a movable cover, a substantially fixed locking element, a movable locking element cooperating with the fixed element to secure the sections closed, means normally urging the movable locking element out of engagement with the fixed element, and an actuating member being engaged by the movable top to actuate the same.

15. In a wardrobe trunk having a pair of sections hinged together, one section having an open top closed by a movable cover, a substantially fixed locking element, a movable locking element co-operating with the fixed element to secure the sections closed, means normally urging the movable locking element out of engagement with the fixed element, an actuating member for the movable locking element and normally lying within the path of but disconnected from the movable top, whereby closing of the movable top engages the same with the actuating member to operate the same and engage the movable locking element with the fixed locking element.

16. In a wardrobe trunk having a pair of sections hinged together, a fixed top for one section and a movable top for the other section, a substantially fixed locking element, a movable locking element co-operating with the fixed element to secure the sections closed, means normally urging the movable locking element out of engagement with the fixed element, an actuating member for the movable locking element and a part carried by the actuating member and extended to lie within the path of the movable top and adapted to be depressed by the top when the same is closed.

17. In a wardrobe trunk having a pair of sections hinged together, a fixed top for one section and a movable top for the other, a substantially fixed locking element carried by one section, a movable locking element carried by the other section and cooperating with the fixed element to secure the sections closed, means normally urging the movable locking element out of engagement with the fixed element, an actuating member for the movable locking element, and a member carried by the movable top and engageable with the actuating member when the top is closed to move the same against the urging means and engage the movable locking element with the fixed locking element.

18. In a wardrobe trunk having a pair of hingedly connected sections and a movable top hinged to one section and movable over the other section to secure the sections together at their tops, of a fixed locking means carried by one section, a movable locking means carried by the other section and engageable with the fixed locking means to lock the sections together at their bottoms, a housing carried by one section side wall and enclosing one locking means and providing a doweling socket, the other locking means serving as a doweling member engaging in the doweling socket when the trunk sections are closed, an actuating member carried by the section mounting the movable locking means, and an operating connection between the movable locking means and the actuating member, said actuating member being actuated by the movable top in closing to engage the movable locking means with the fixed locking means.

19. In a wardrobe trunk having a pair of hingedly connected sections and a movable top hinged to one section and movable over the other to secure the sections adjacent their tops, of a fixed catch member carried by one section, a movable catch member carried by the other section and engageable with the fixed catch member to lock the sections adjacent their bottoms, a housing carried by one section side wall and enclosing one of said catch members and, with a recess in the adjacent section side wall, forming a doweling socket, the other member serving as a doweling member engaging in the doweling socket when the trunk sections are closed, and means operable by the closing of said movable top to engage the movable catch member with the fixed catch member and secure the sections closed.

20. In a wardrobe trunk having a pair of sections hinged together, a movable top carried by one section and overlying the other when closed, a locking element carried by one section and a second locking element movably carried by the other section and adapted to engage the former when the sections are closed, means normally urging the second locking element out of engagement with the first, and an actuating member connected with the second locking element and having its free end lying within the path of the movable top whereby closing movement of the top depresses the actuating member to lock said sections together.

21. In a wardrobe trunk having a pair of sections hinged together, a movable top carried by one section and overlying the other when closed to lock the sections together at one end, locking means adjacent the other end of the sections and operable upon the closing movement of said movable top, said locking means including a fixed element and a movable element, the latter element being engageable with the former to lock the sections together, and actuating means connected with the movable element and engageable with the movable top during its closing movement to actuate the same.

In testimony whereof I hereunto affix my signature.

MILTON H. LUCE.